US009239765B2

United States Patent
Block et al.

(10) Patent No.: US 9,239,765 B2
(45) Date of Patent: Jan. 19, 2016

(54) APPLICATION TRIGGERED STATE MIGRATION VIA HYPERVISOR

(75) Inventors: Frederick P. Block, Westminster, CO (US); Anjur S. Krishnakumar, Princeton, NJ (US); Parameshwaran Krishnan, Basking Ridge, NJ (US); Navjot Singh, Denville, NJ (US); Shalini Yajnik, Berkeley Heights, NJ (US)

(73) Assignee: AVAYA INC., Basking Ridge, NJ (US)

( * ) Notice: Subject to any disclaimer, the term of this patent is extended or adjusted under 35 U.S.C. 154(b) by 517 days.

(21) Appl. No.: 12/873,052

(22) Filed: Aug. 31, 2010

(65) Prior Publication Data

US 2012/0054409 A1 Mar. 1, 2012

(51) Int. Cl.
G06F 9/455 (2006.01)
G06F 21/00 (2013.01)
G06F 11/00 (2006.01)
G06F 11/20 (2006.01)
G06F 11/14 (2006.01)
G06F 9/48 (2006.01)
G06F 11/22 (2006.01)

(52) U.S. Cl.
CPC ........ *G06F 11/2046* (2013.01); *G06F 9/45558* (2013.01); *G06F 11/1484* (2013.01); *G06F 11/203* (2013.01); *G06F 9/4881* (2013.01); *G06F 11/2043* (2013.01); *G06F 11/22* (2013.01); *G06F 21/00* (2013.01); *G06F 2009/4557* (2013.01)

(58) Field of Classification Search
CPC ........ G09G 9/4881; G05F 21/00; G06F 11/22
USPC ................... 718/1; 714/4.11; 711/6
See application file for complete search history.

(56) References Cited

U.S. PATENT DOCUMENTS

| 5,659,691 | A | * | 8/1997 | Durward et al. | 715/757 |
|---|---|---|---|---|---|
| 5,752,266 | A | * | 5/1998 | Miyawaki et al. | 711/158 |
| 6,182,086 | B1 | * | 1/2001 | Lomet et al. | |
| 6,581,115 | B1 | * | 6/2003 | Arimilli et al. | 710/107 |
| 7,103,728 | B2 | * | 9/2006 | Sharma et al. | 711/154 |
| 2009/0037554 | A1 | * | 2/2009 | Herington | 709/213 |
| 2009/0307447 | A1 | * | 12/2009 | Jacobs et al. | 711/162 |
| 2010/0107158 | A1 | | 4/2010 | Chen et al. | |
| 2010/0299666 | A1 | * | 11/2010 | Agbaria et al. | 718/1 |
| 2011/0321041 | A1 | * | 12/2011 | Bhat et al. | 718/1 |

* cited by examiner

*Primary Examiner* — Camquy Truong
(74) *Attorney, Agent, or Firm* — Amin, Turocy & Watson, LLP (57) ABSTRACT

Systems and methods that enable migration for state of an application, from a primary machine to a backup machine in platform virtualization systems. The migration employs a hybrid approach, wherein both a hypervisor, and an application itself determine states that are to migrate from the primary machine to the backup machine. Based on a direct communication between the application and the hypervisor—without assistance of local operating system—the hypervisor arranges for migration of the required states over to the backup virtual machine.

20 Claims, 11 Drawing Sheets

APPLICATION TRIGGERED STATE MIGRATION VIA HYPERVISOR

BACKGROUND

With the advent of highly sophisticated computer software/hardware, various computational servicing areas have been created to meet a myriad of consumer demands. Typically, computational services are undertaken upon a client or within a proprietary intranet. Client-side systems are generally employed to manage relationships between users, software applications, services, and hardware within a client machine, as well as data resident upon a respective intranet. In addition to client-side systems that provide services, off-site systems (e.g., third party) can also provide services in order to improve data capability, integrity, reliability, versioning, security, and mitigate costs associated therewith.

In general, such services can be employed to manage relationship between users, provide software applications, enhance hardware capabilities, manage data, optimize security, and the like. For example, a third party service can enable a client to store data solely by the third party capabilities (e.g., hardware, software, etc.) With such increase in growth related to servicing businesses, associated data may also be at risk of loss as a result of planned events (e.g., strike, closing, shut downs, etc.), or unforeseen circumstances such as, catastrophic failures, destruction, and the like.

Moreover, when required to support a large-scale user base or to provide a high-level of availability, such services are often provided in a data center using one of many service-oriented architectures (SOA). Typically, implementation of an SOA requires tools as well as run-time infrastructure software, which can collectively be referred to as SOA implementation framework. Such frameworks have unique requirements at both the tools and infrastructure levels. For example, these can include a distributed event-enabled architecture, flexibility via service-enabled processes, enterprise standards support (fault tolerance, reliability, and scalability), security in distributed environment, visual process composition/monitoring, and support for rapid process changes or process development, to enable providing new and improved user services.

Furthermore, server virtualization has become central to data center disaster recovery planning. Such server virtualization can reduce costs related to idle physical servers/data center footprint, and can further improve uptime/recovery time for matters pertaining to disaster recovery. Moreover, data integrity can further be ensured for retrieval of high-availability system management and failover. Such high-availability systems include systems or components that are continuously operational for a desirably long length of time (e.g., availability can be measured relative to "100% operational" or "never failing"), for example.

Likewise and in case of server consolidation, many small physical servers can be replaced by a larger physical server, to facilitate utilization of costly hardware resources such as CPU. Typically, even though hardware can be consolidated, operating systems (OSs) are not. Rather, each OS running on a physical server can convert to a distinct OS running inside a virtual machine. Hence, the large server can "host" many such "guest" virtual machines (e.g., a Physical-to-Virtual—P2V-transformation.)

Accordingly and as compared to a real physical machine, a virtual machine (VM) can be readily controlled and inspected from outside, and its configuration can be more flexibly maintained—wherein multiple virtual servers can run on a single physical server, to more fully utilize hardware resources thereof. Moreover, depending on type of virtualization software employed, a virtual machine can further be duplicated and installed on multiple hosts.

Nonetheless, tracking a state of a virtual machine as a whole, and checkpoint migration for a state of the VM (including its OS) can cause excessive overhead in terms of both network bandwidth and required computing cycles. Furthermore, delays associated with such procedures can become unacceptable for various applications, such as real-time media. Similarly, application-based checkpointing processes typically do not account for associated overheads (e.g., related to additional virtualization layers), and can encounter substantially high delays and additional computing cycles.

SUMMARY

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

Various aspects of the subject innovation facilitate migration for state of an application, from a primary machine to a backup machine in platform virtualization systems. In one aspect, such migration can occur via a hybrid approach—wherein both a virtual machine monitor (e.g., a hypervisor), and an application itself (e.g., an application running inside a virtual machine), determine states that are to migrate from the primary machine to the backup machine. The application can determine information about states that are required to be migrated, and further communicates such information to the hypervisor (e.g., a direct communication occurring between the application and the hypervisor—without assistance of local operating system of the platform virtualization system.) Based on such information received, the hypervisor arranges for migration of the required states over to the backup virtual machine. For example, the application can indicate transaction boundaries for each migration to the hypervisor, and maintain consistency of the state to be transferred. Hence, overhead (e.g., bandwidth, computer cycles) and associated delays can be mitigated, as there no longer exists a requirement to track state of the virtual machine as a whole during migration processes.

In a related aspect, a shared-memory based signaling mechanism can be employed to communicate critical memory areas and transaction boundaries to the hypervisor (e.g., by employing a shared page between the application and the hypervisor.) Memory areas that are to be saved across failures are initially determined, and subsequently communicated to the hypervisor through the shared memory and based on the signaling mechanism. For example, the hypervisor can employ a shadowed page table mechanism, to track any "writes" in such memory areas, and migrate them to the backup machine. After the application signals a transaction boundary, the hypervisor can commit the updates that were sent to the backup via replacing the original memory of the backup with the updated memory. Moreover and during such committing, the hypervisor can freeze the application and/or virtual machine.

The following description and the annexed drawings set forth in detail certain illustrative aspects of the claimed subject matter. These aspects are indicative, however, of but a few of the various ways in which the principles of such matter may be employed and the claimed subject matter is intended to include all such aspects and their equivalents. Other advantages and novel features will become apparent from the following detailed description when considered in conjunction with the drawings.

DETAILED DESCRIPTION

The various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

Figure 1:
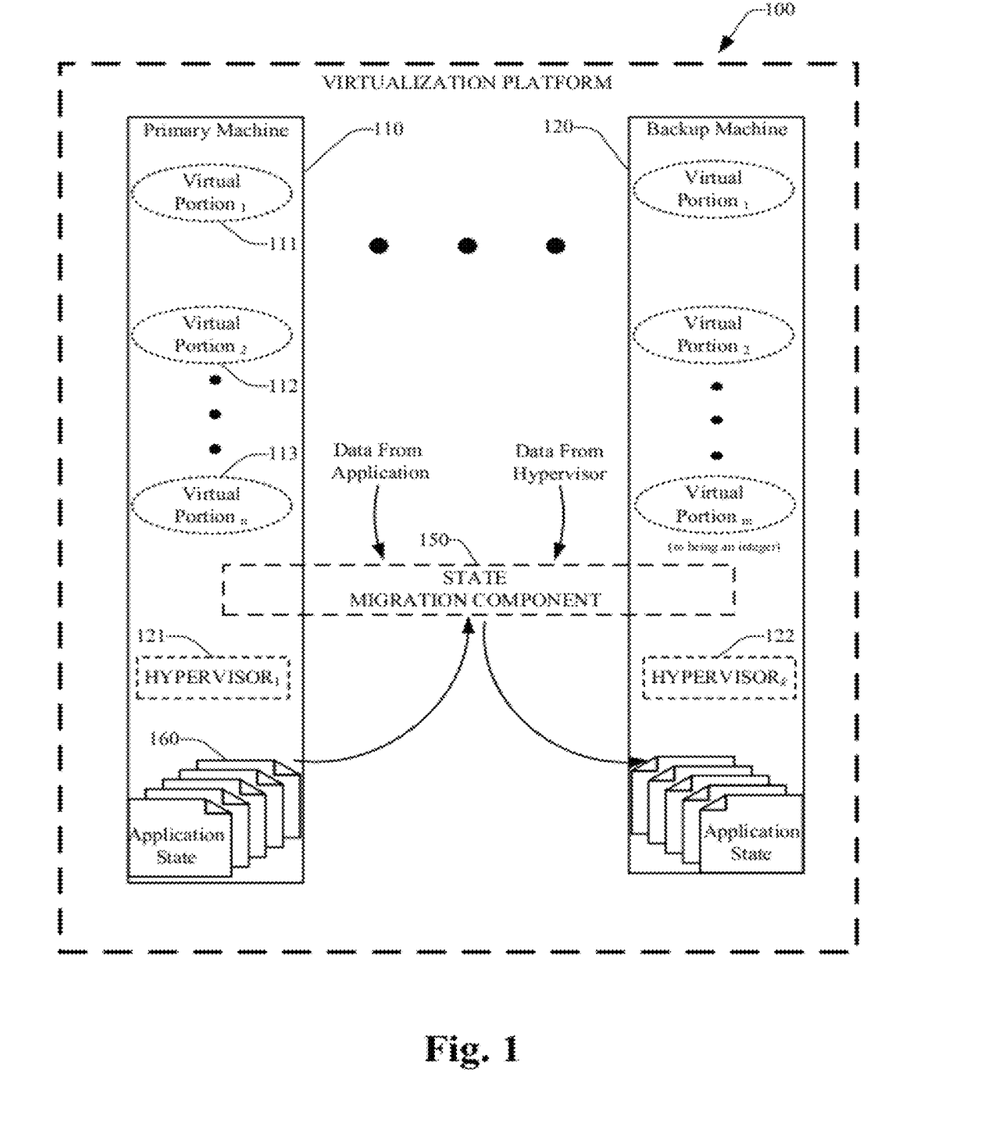
FIG. 1 illustrates a block diagram of an exemplary system that employs a hybrid approach for state transfer of an application—via a state migration component, in accordance with an aspect of the subject innovation.

FIG. 1 illustrates an exemplary virtualization platform 100 that can facilitate migration for state of an application, from a primary machine 110 to a backup machine 120, via a state migration component 150. Such state migration component 150 enables both a virtual machine monitor (e.g., a hypervisor), and an application itself (e.g., an application running inside a virtual machine), to determine states that are to migrate from the primary machine 110 to the backup machine 120. It is to be appreciated that even though FIG. 1 illustrates the state migration component 150 as being split between the primary machine 110 and backup machine 120, other variations such as the state migration component being distributed among the application(s) and/or hypervisor(s) or additional machines, or as a separate entity outside the machines are well within the realm of the subject innovation.

Typically, the virtualization platform 100 enables abstraction of both hardware and software at multiple levels, from individual servers and clients to complete networks. For example, the virtualization platform 100 abstracts the resources of physical computer machines to create larger pools of processor and memory resources that can be allocated dynamically to applications or processes, as requirements of the system changes. Moreover, such virtualization can partition physical server(s) into several "virtual portions/machines" 111, 112, 113 (1 thru n, n being an integer) each of which can run its own "guest" operating system and application environment. Accordingly, workloads can be consolidated to run multiple applications on the resources of shared servers, such that available hardware and/or software can be efficiently utilized.

In one aspect, the hypervisors 121, 122, (1 thru k, k being an integer) can be deployed and accessed via a plurality of processes from management clients (not shown). Such hypervisors can construct systems on which multiple different applications and operating systems can run. Stated differently, the hypervisor can abstract the physical hardware of the server machine from operating system(s) and the application(s) running thereon—such that each application and operating system can become a virtual machine within its respective environment.

For example, each of the hypervisors 121, 122 can provide virtual resources for an operating system, to simulate access of such operating system to an associated physical device. Moreover, the hypervisor 121, 122 can provide virtual resources to any number of guest operating systems (e.g., emulating virtual hardware, partition physical hardware, virtualizing physical hardware, executing virtual machines that provide access to computing environments, and the like).

As explained earlier, a computing device executing an operating system and a hypervisor can be referred to as having a host operating system (represented by the operating system executing on the computing device), and a guest operating system (represented by an operating system executing within a computing resource partition provided by the hypervisor). Moreover, the hypervisor 121, 122 can interact directly with the application—without assistance of local operating system. Based on such information received, the hypervisor arranges for migration of a required application state 160 over the backup machine 120 (e.g., a virtual machine.) For example, the application can indicate transaction boundaries for each migration to the hypervisor, and maintain consistency of the state to be transferred. Hence, overhead (e.g., bandwidth, computer cycles) and delays can be mitigated, as there no longer exists a requirement to track state of the virtual machine as a whole—during the migration processes. It is to be appreciated that in conventional systems, a communication between the hypervisor and the application occurs through associated operating systems—and hence the application does not communicate directly with the hypervisor.

Similarly, the hypervisor 121, 122 can control processor scheduling and memory partitioning for a virtual machine 110, 120, which executes on the virtualization platform 100. For example, the hypervisor 121, 122 can control whether and how physical processor capabilities are presented. A control operating system can execute at least one application for managing and configuring the guest operating systems. Moreover, the control operating system can execute an administrative application, such as an application including a user interface providing administrators with access to functionality for managing the execution of a virtual machine, such as functionality for executing a virtual machine, terminating an execution of a virtual machine, or identifying a type of physical resource for allocation to such virtual machine.

Likewise, the guest operating system can provide a user of the virtualization platform 100 with access to a resource within the computing environment. For example, such a resource can include a program, an application, a document, a file, an executable, a desktop environment, a computing environment, and the like. It is to be appreciated that such a resource can be delivered to the virtualization platform 100 via a plurality of access methods—such as delivery: via conventional installation directly on the virtualization platform 100; via a method for application streaming; via output data generated by an execution of the resource on another computing device and communicated to the virtualization platform 100 thru a presentation layer protocol; or execution from a removable storage device connected to the virtualization platform 100, via a virtual machine executing on the virtualization platform 100 and generating output data, and the like.

Figure 2:
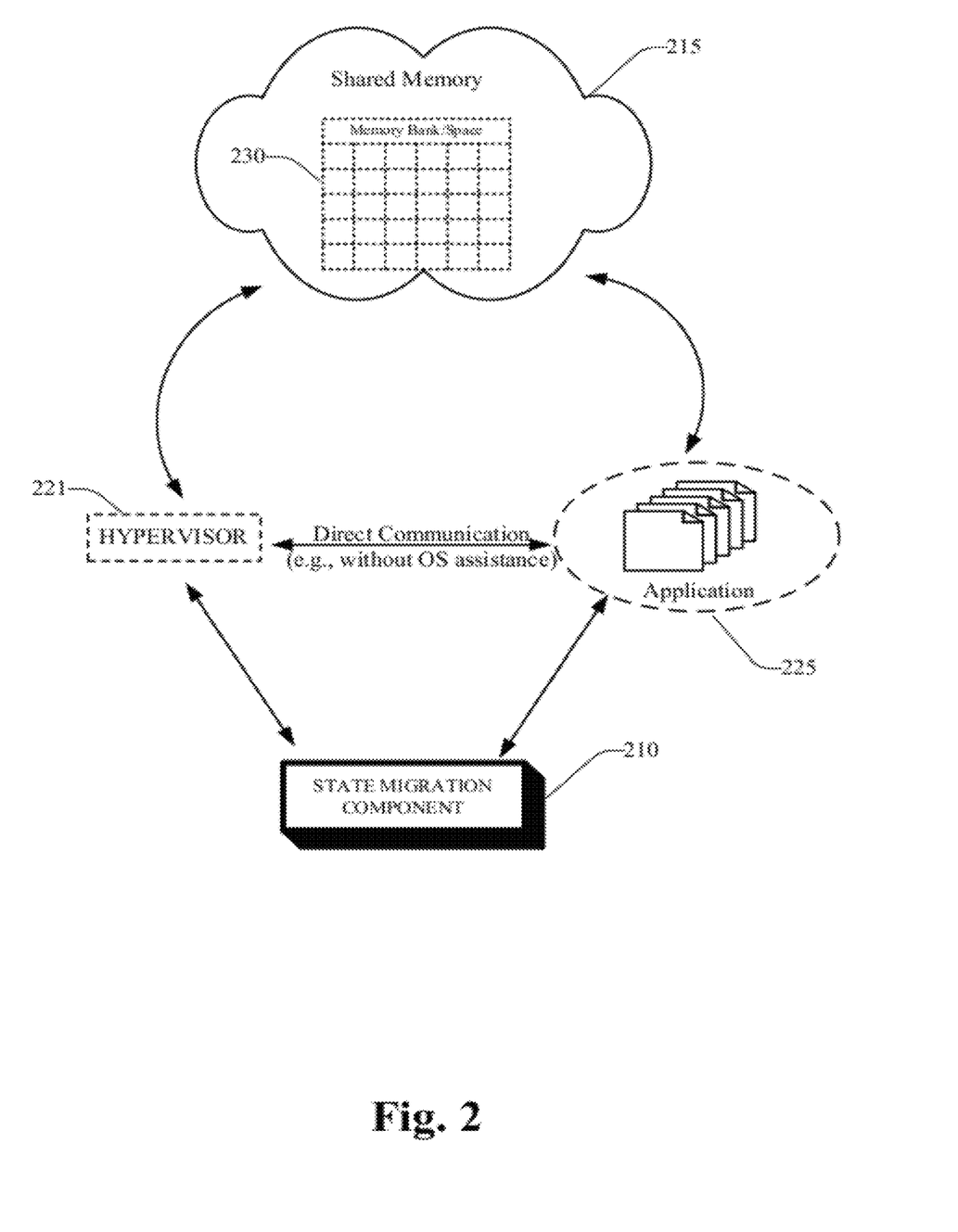
FIG. 2 illustrates a further exemplary aspect of a state migration component that employs a shared memory, in accordance with an aspect of the subject innovation.

FIG. 2 illustrates a further exemplary aspect of a state migration component 210 that employs a shared memory 215, in accordance with an aspect of the subject innovation. In one aspect, a shared-memory based signaling mechanism can be employed to communicate critical memory areas and transaction boundaries to the hypervisor 221 (e.g., by employing a shared page between the application and the hypervisor.) Memory spaces 230 that are to be saved across failures are initially determined, and subsequently communicated to the hypervisor 221 through the shared memory 215 and based on the signaling mechanism. In general, the system memory can typically be divided into individually addressable unit or units, commonly referred to as "pages," each of which can contain many separately addressable data words, which typically can include several bytes. Such pages can further be identified by addresses commonly referred to as "page numbers."

The application(s) 225 can desire a state thereof to be moved from a first machine (e.g., an active machine that sends the data) to a second machine (e.g., a backup machine or a passive machine that receives such data), wherein the state migration component 210 can exist as part of both machines. Items that are to be copied on the secondary machine can be identified and an associated period for such transfer designated. Subsequently, a negotiation can occur between the first machine and the second machine. The application on machine$_1$ can directly communicate with hypervisor on machine$_1$ (e.g., without employing an associated operating system) and include a state that is required to be transferred to machine$_2$. As such, the hypervisor 221 enables mapping address space from the application on to the backup machine. For example, the hypervisor 221 can mark-up memory areas of interest—wherein as the application 225 is processing the data, the hypervisor 221 is marking areas that have been changed and marked as "dirty" (e.g., changed.) Subsequently, the hypervisor 221 and the application 225 can initiate migrating of data to backup server side. The application 225 can signal end transaction, wherein as part thereof—the hypervisor 221 ensures that the application 225 is frozen and memory areas can be copied to the backup server. According to a further aspect, the dirty pages can be communicated to the application, which further implements the memory copying. Such aspects of the subject innovation can increase efficiencies associated with various operations (e.g., computationally.)

Accordingly, the hypervisor 221 maintains lists of pages and verifies whether such pages are changing or not. Periodically, changes can then be committed, wherein during a time that the transaction is committed, the application(s) freezes, hence rendering it (and/or the virtual machine associated therewith) temporarily unusable (e.g., by freezing the virtual machine). Such freeze period can typically ensure that the most current data is applied to the backup machine.

Moreover, such shared memory 215 approach for communication further enables an application within a virtual machine to directly communicate with the hypervisor 221—without requiring assistance of the operating system. For example, the application 225 can communicate the shared page using other methods—such as a network socket—and subsequently can perform all communication through such shared memory page.

Figure 3:
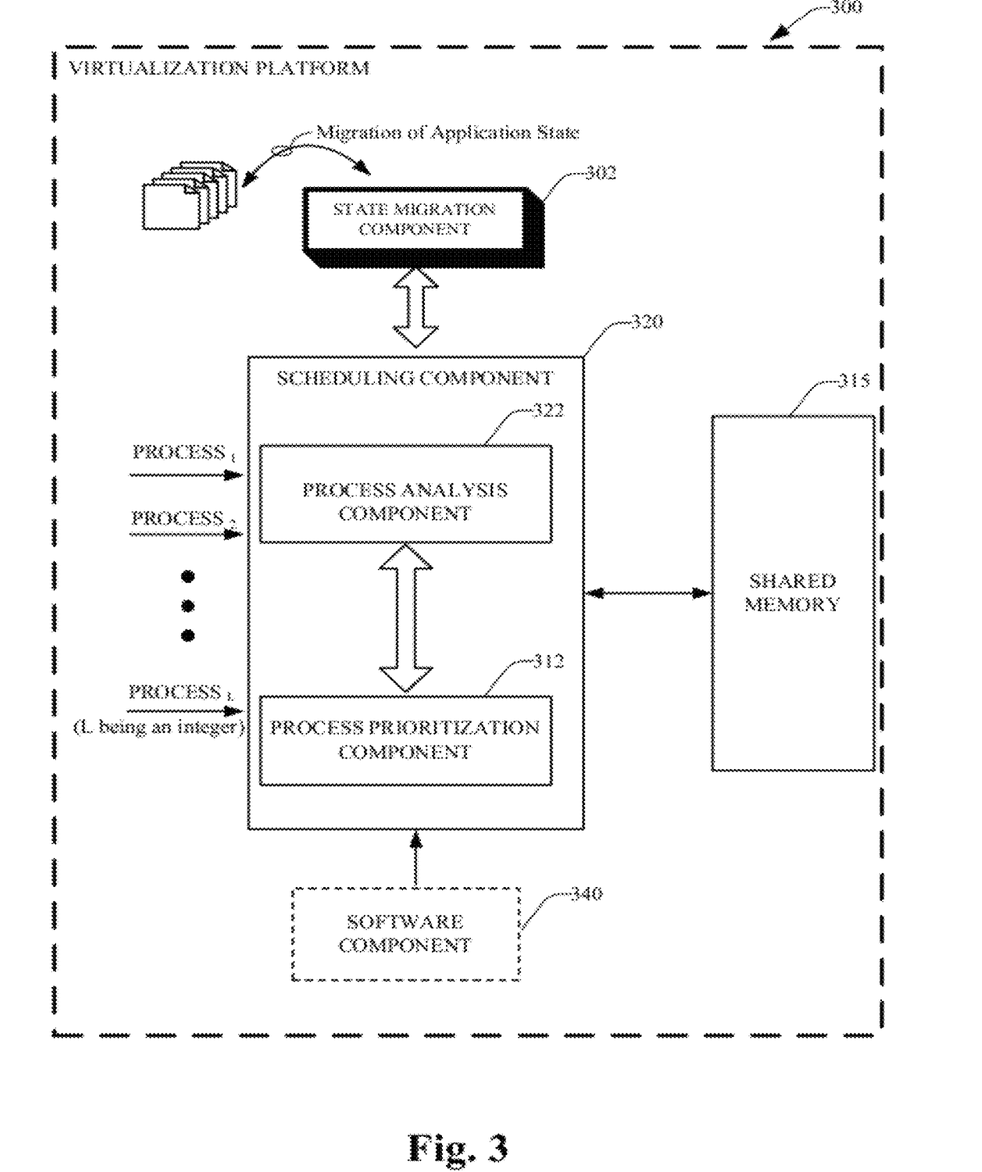
FIG. 3 illustrates a particular state migration component that is associated with a scheduling component, in accordance with a particular aspect of the subject innovation.

FIG. 3 illustrates a state migration component 302 that is associated with a scheduling component 320, which can schedule requests by processes of execution for access to the shared memory 315, in accordance with a particular aspect of the subject innovation. The virtualization platform 300 can run multiple operating systems simultaneously on one or more physical servers. The scheduling component 320 can further adjust to support external control by a software component 340, to facilitate efficient scheduling. Such scheduling can further be based on factors such as host resource management (e.g., memory and processor management), page shadowing, page table management, exception handling, load balancing, event handling, critical resource management, and the like. The state migration component 302 enables both a virtual machine monitor (e.g., a hypervisor), and an application itself (e.g., an application running inside a virtual machine), to determine states that are to migrate from a primary machine to a backup machine.

The scheduling component 320 can further include a process analysis component 322 that analyzes one or more processes requesting access to the shared memory 315 based on an effect of at least one of memory bandwidth, latency, and bank parallelism on performance of the memory system. Such scheduling component 320 can further include a process prioritization component 312 that can apply a stall-time fairness policy, which prioritizes requests from the one or more processes based on the analysis of the process analysis component 322, for example.

The scheduling component 320 can further maintain memory page sharing, in a virtualized system, even when a Guest operating system (OS) or other Guest software attempts to write to the shared memory. In addition, the hypervisor (e.g., a virtual machine monitor or other software or logic in a virtualized system) can employ a pattern matcher or similar techniques to recognize and intercept page zeroing code in the Guest OS, or other code that writes some other content of interest to the memory page, for example.

Figure 4:
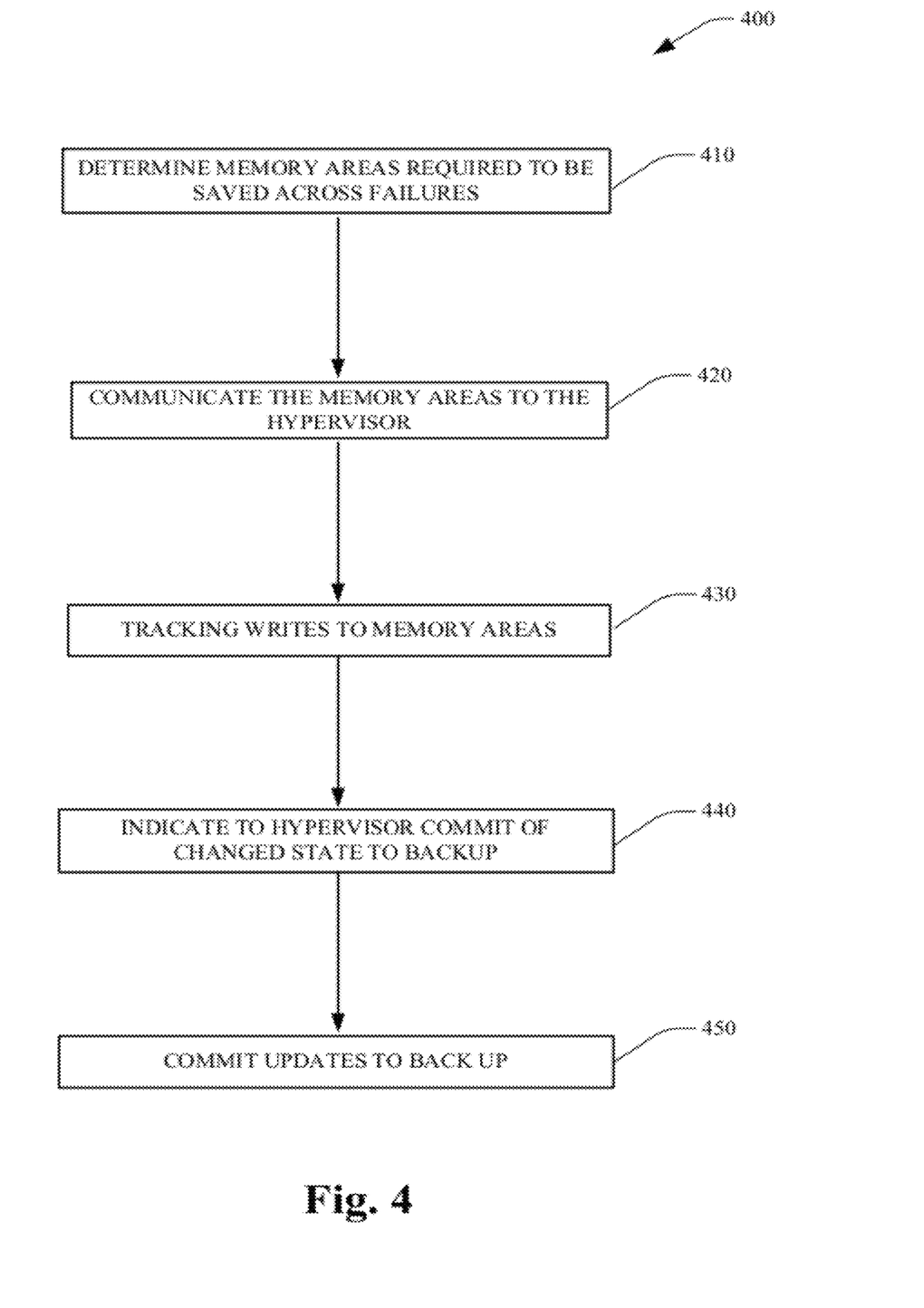
FIG. 4 illustrates a related methodology of preserving application states among failures—via migrating state of an application from a primary machine to a backup machine in platform virtualization systems.

FIG. 4 illustrates a related methodology 400 of preserving application states during failures via migrating a state of an application from a primary machine to a backup machine in platform virtualization systems, according to an exemplary aspect. While this exemplary method is illustrated and described herein as a series of blocks representative of various events and/or acts, the subject innovation is not limited by the illustrated ordering of such blocks. For instance, some acts or events may occur in different orders and/or concurrently with other acts or events, apart from the ordering illustrated herein, in accordance with the invention. In addition, not all illustrated blocks, events or acts, may be required to implement a methodology in accordance with the subject innovation. Moreover, it will be appreciated that the exemplary method and other methods according to the innovation may be implemented in association with the method illustrated and described herein, as well as in association with other systems and apparatus not illustrated or described.

Initially and at 410 the application determines which memory areas are required to be saved across failures. Such determination can be based on various criticality measures as customized for the virtualization platform. Subsequently and at 420, the memory areas can then be communicated to the hypervisor through a shared-memory based approach. At 430, the hypervisor can track any writes to such memory areas (e.g., by employing a shadowed page table mechanism) for a migration thereof to the backup machine and saving in a temporary location. Subsequently, and at 440 the application indicates to the hypervisor that it is ready to commit any changed state to the backup, at transaction boundaries. Such indication and/or signaling can also be performed through a shared page between the application and the hypervisor. After the application signals a transaction boundary, and at 450 the hypervisor commits the updates that were sent to the backup by replacing the original memory of the backup with the updated memory. The hypervisor can also freeze the application/virtual machine while performing the commit during such period or stage. According to a further aspect, the communication can also be performed via polling of the shared pages or generation of a page fault, to indicate that new matter has been written to the page shared between the hypervisor and application. As explained earlier, the state migration component can further be distributed between the hypervisor and the application/virtual machines.

Figure 5:
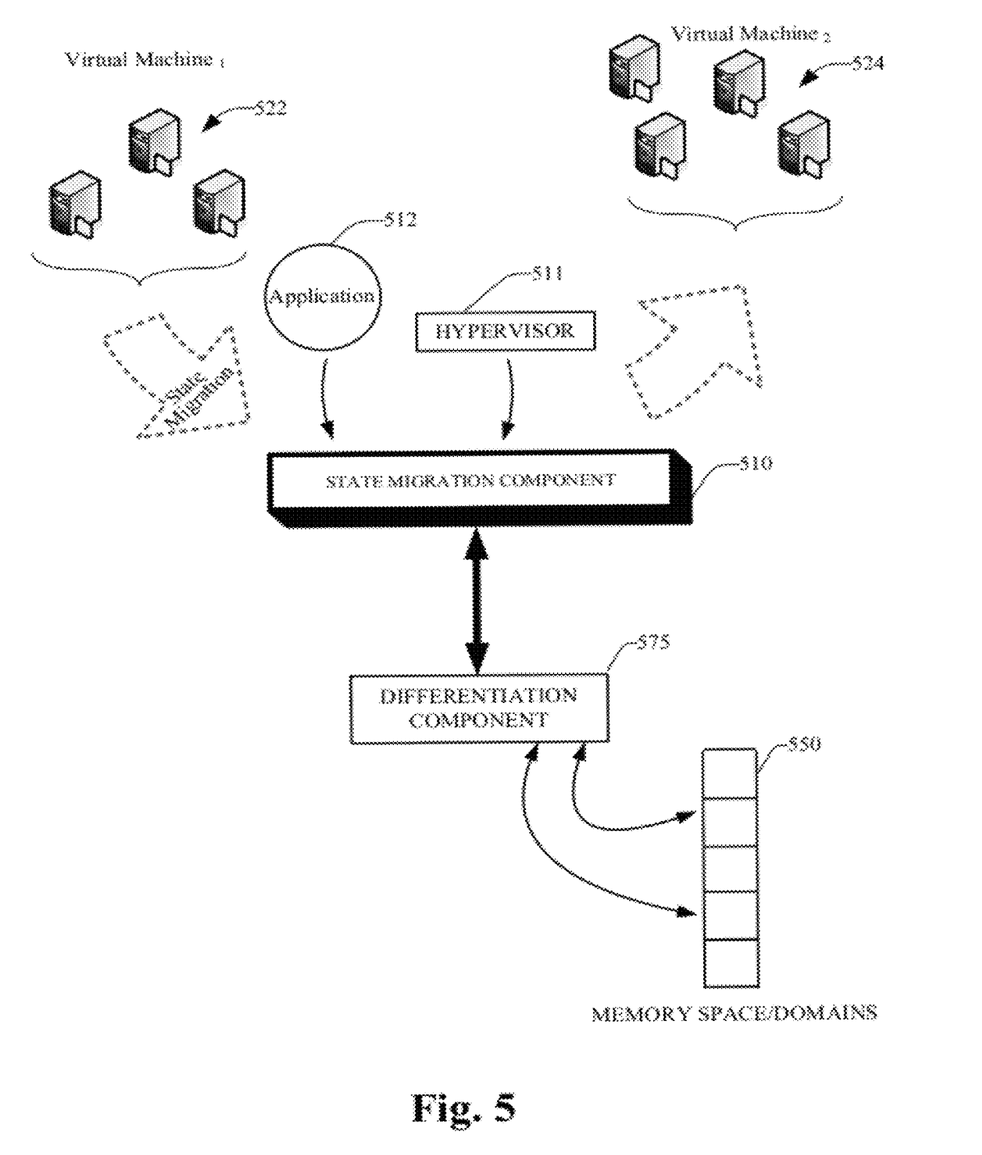
FIG. 5 illustrates a state migration component that enables migration for state of an application, from a primary machine to a backup machine in platform virtualization systems.

FIG. 5 illustrates a state migration component 510 that migrates state of an application 512, from a primary machine 522 to a backup machine 524 in platform virtualization systems—wherein both a virtual machine monitor such as a hypervisor 511), and an application 512 itself (e.g., an application running inside a virtual machine), determine states that are to migrate from the primary machine to the backup machine.

As explained earlier, a shared-memory based signaling mechanism can be employed to communicate critical memory areas and transaction boundaries to the hypervisor 511 (e.g., by employing a shared page between the application and the hypervisor 511.) Memory areas that are to be saved across failures are initially determined, and subsequently communicated to the hypervisor 511 through the shared memory and based on the signaling mechanism.

In one aspect, system configuration for sharing memory unit 550 can include pages, in a computer system that includes a hardware memory and at least one "context". In general, the term "context" can represent any software or hardware component, device or system, which addresses and reads from hardware memory and that has its own address translation state. For example, a "context" can represent a process, which can include an address space and associated page tables that contain information about how to map virtual pages to physical pages. Such can further include page-level protection information, such as "read-only" for copy on write (COW) pages.

In a related aspect, only portions of a page that have been changed are transferred. As such, a copy-on-write can create a copy of the original of the page, and a differentiation component 575 can subsequently identify changed portions by comparing differences between the original and the changed page. Stated differently redundant processing can be mitigated by comparing contents of various memory spaces on the primary machine, to determine a difference of content that can then be employed for analyzing difference of contents, and subsequent state migration procedures.

Accordingly, memory areas 550 that are to be saved across failures are identified and communicated to the hypervisor 511 through the shared memory and based on the signaling mechanism. Hence, the hypervisor 511 can employ a shadowed page table mechanism, to track any "writes" in such memory areas, and migrate them to the backup machine. After the application signals a transaction boundary, the hypervisor 511 can commit the updates that were sent to the backup via replacing the original memory of the backup with the updated memory. Moreover, the hypervisor 511 can freeze the application/virtual machine during the commit period.

Figure 6:
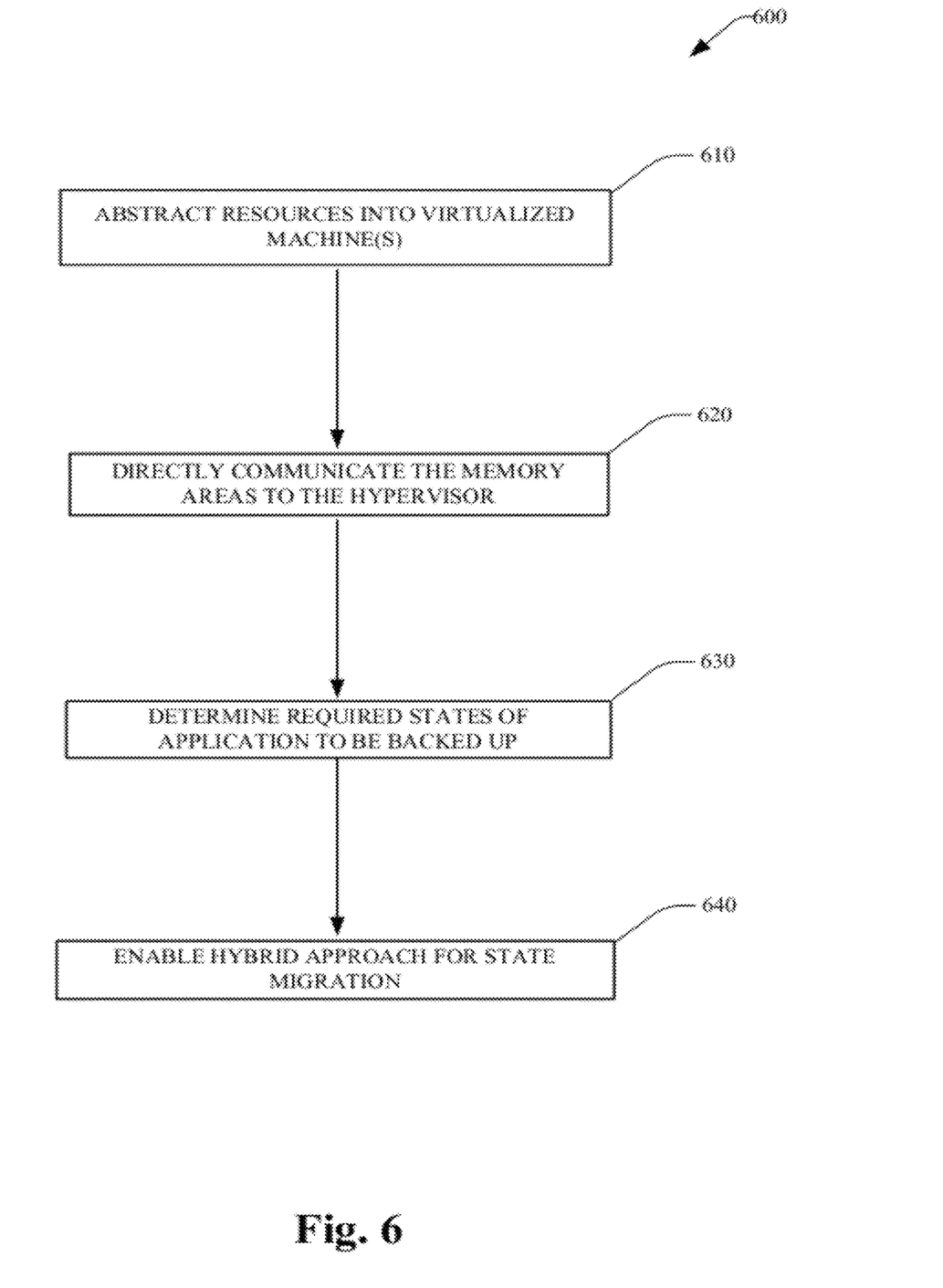
FIG. 6 illustrates a methodology of employing a hybrid approach, wherein both a virtual machine monitor and an application itself can determine states that are to migrate from the primary machine to the backup machine.

FIG. 6 illustrates a methodology 600 of employing a hybrid approach wherein both a virtual machine monitor such as a hypervisor, and an application itself such as an application running inside a virtual machine, can determine states that are to migrate from the primary machine to the backup machine. Initially and at 610, physical resources of computer machines can be abstracted as a virtualized platform. For example, the virtualization platform can abstract the resources of physical computer machines to create larger pools of processor and memory resources that can be allocated dynamically to applications or processes, as requirements of the system changes. Subsequently, and at 620 the application can communicate directly with the hypervisor without employing an operating system associated with the virtualized platform. For example, such direct communication can further be in an encrypted form that further enhances security of protocols. At 630, and based on such information received, the hypervisor arranges for migration of the required states over the backup virtual machine. Accordingly, and at 640 a hybrid approach can be enabled for state migration in the virtualization platform.

Figure 7:
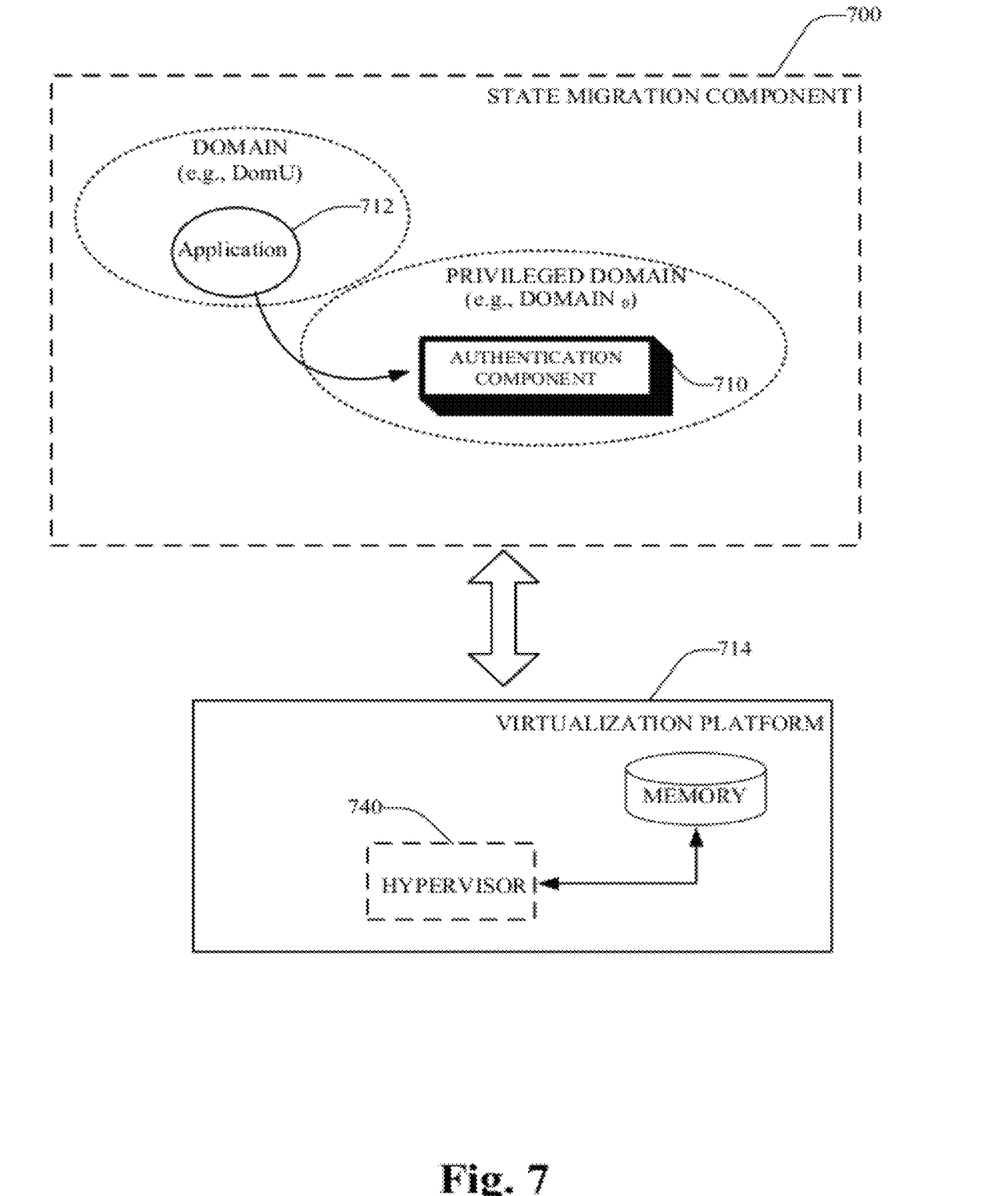
FIG. 7 illustrates a particular state migration component according to a further aspect of the subject innovation.

FIG. 7 illustrates a particular state migration component 700 according to a further aspect of the subject innovation, which includes an authentication component 710. Such authentication component 710 enables the application 712 to authenticate itself to a domain (e.g., in context of the Xen® that represents an open source industry standard for virtualization, such domain can represent domain 0 that indicates a special purpose domain, which is privileged by the hypervisor to directly access hardware and create/terminate other domains). Typically, a domain having a domain ID represents an execution context that contains a running virtual machine—(e.g., a relationship between virtual machines/domains and the hypervisor can be analogized to that of between programs/processes and an operating system.) The domain (virtual machine) referred to as Dom0 and other guest domains referred to DomU (in context of Xen®), can run above the hypervisor—similar to an application running on the OS. Upon verification and proper authentication, identification such as a token can subsequently be assigned to an associated page number, hence enabling direct communication between the application 712 and a hypervisor. For example, Dom0 can notify the hypervisor 740 to expect contact from the application 712 via a predetermined identification token.

As explained earlier, a virtual machine (VM) can be installed as part of the virtualization platform 714 to run as a guest on the host system hardware and software. For example, each virtual machine can typically include virtual CPUs, a virtual operating system(s), virtual system memory, a virtual disk, virtual peripheral devices and drivers for handling the virtual devices—all of which can be implemented in software to emulate corresponding components of an actual computer. In addition, the hypervisor 740 or virtual machine monitor can be represented by a unit of software that can run on the hardware, and virtualizes various resources of the machine.

Furthermore, each hypervisor can typically include other software components, such as device emulators that emulate the characteristics of respective physical device, an interrupt handler, and the like.

Moreover and as discussed, the hypervisor 740 can virtualize the physical resources such as CPUs and memory for the guest domains. The non-privileged instructions can be executed by the guest domains natively without the intervention of the hypervisor. Yet, the privileged instructions can generate a trap into the hypervisor 740, wherein the hypervisor 740 can then validate the request and allow it to continue. In a related aspect, as the I/O devices are shared across all the guest domains, the hypervisor 740 can control access to them. Moreover, a delegation approach can also be provided for I/O, via a split device driver model, wherein each I/O device driver (e.g., referred to as the backend driver) can run in Dom0 (in context of Xen®). In addition, the guest domain can include a frontend driver, which communicates with the backend driver via shared memory. The split I/O model can further require implementation in Dom0 and DomU.

As explained earlier, such virtualization enables isolation of the VM from other components, and supplies a transparent user experience that typically operates completely within a virtual address space—which can further be defined by the VMM (e.g., a change in mapping of physical addresses can be accomplished in a manner that is transparent to the VM, and that does not require modifications to the underlying guest operating system.) In addition, the memory sharing module in such virtualized platform can further be located within a system-level software kernel, so that page sharing can be efficiently managed, for example.

Figure 8:
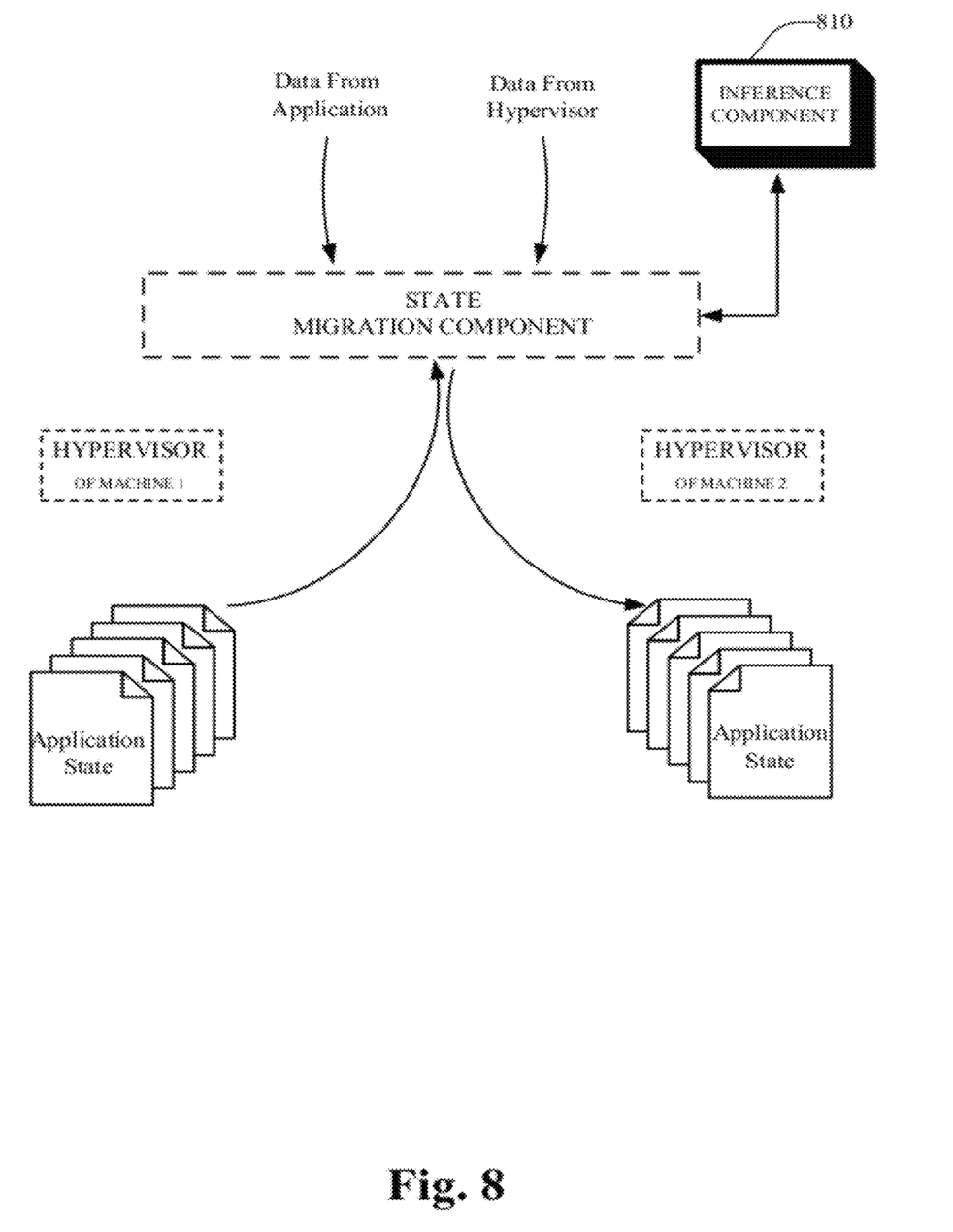
FIG. 8 illustrates an inference component that facilitates state migration, in accordance with an aspect of the subject innovation.

FIG. 8 illustrates an inference component 810 (e.g., an artificial intelligence—AI) that can facilitate inferring and/or determining when, where, and how to facilitate migration for state of an application from a primary machine to a backup machine, in accordance with an aspect of the subject innovation. As used herein, the term "inference" refers generally to the process of reasoning about or inferring states of the system, environment, and/or user from a set of observations as captured via events and/or data. Inference can identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

The inference component 810 can employ any of a variety of suitable AI-based schemes as described supra in connection with facilitating various aspects of the herein described invention. For example, a process for learning explicitly or implicitly how parameters are to be created for training models based on escalations of contact can be facilitated via an automatic classification system and process. Classification can employ a probabilistic and/or statistical-based analysis (e.g., factoring into the analysis utilities and costs) to prognose or infer an action that a user desires to be automatically performed. For example, a support vector machine (SVM) classifier can be employed. Other classification approaches include Bayesian networks, decision trees, and probabilistic classification models providing different patterns of independence can be employed. Classification as used herein also is inclusive of statistical regression that is utilized to develop prioritizing models.

As will be readily appreciated from the subject specification, the subject innovation can employ classifiers that are explicitly trained (e.g., via a generic training data) as well as implicitly trained (e.g., via observing user behavior, receiving extrinsic information) so that the classifier is used to automatically determine according to a predetermined criteria which answer to return to a question. For example, SVM's can be configured via a learning or training phase within a classifier constructor and feature selection module. A classifier is a function that maps an input attribute vector, x=(x1, x2, x3, x4, xn), to a confidence that the input belongs to a class—that is, f(x)=confidence(class). As explained earlier, the migration can occur via a hybrid approach—wherein both a virtual machine monitor (e.g., a hypervisor), and an application itself (e.g., an application running inside a virtual machine), determine states that are to migrate from the primary machine to the backup machine.

Figure 9:
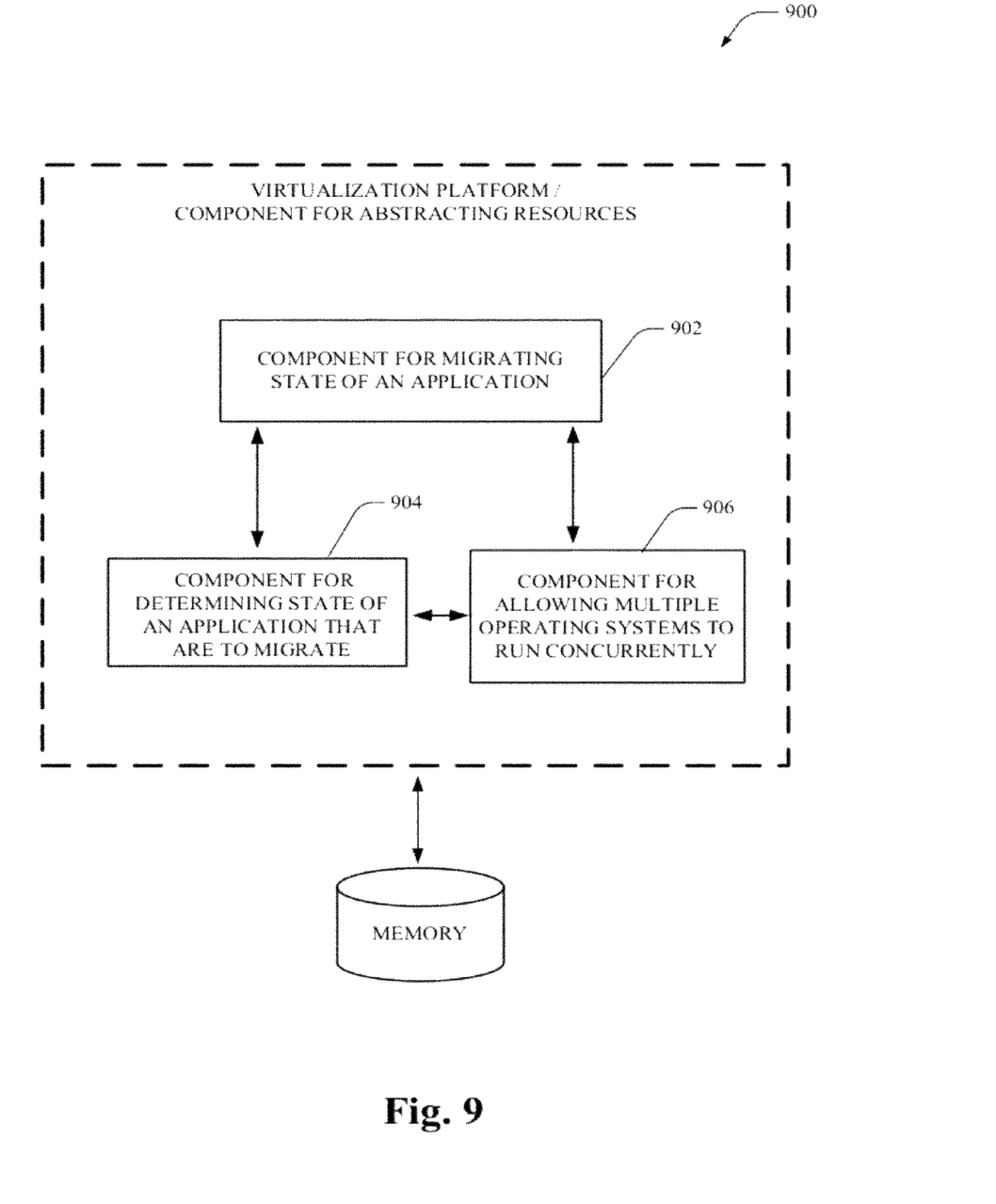
FIG. 9 illustrates a block diagram for a particular system that employs a hybrid approach for state transfer of an application, via a state migration component.

FIG. 9 illustrates a system 900 that includes a component 902 for migrating state of an application from a primary machine to a backup machine (e.g., means for migrating state of an application.) The system 900 further includes logical grouping 904 of entities for determining state of an application that are to migrate (e.g., means for determining state.) The logical grouping 904 communicates such information directly to logical grouping 906—without assistance of local operating system. The logical grouping 906 includes entities for allowing multiple operating systems to run concurrently (e.g., means for enabling concurrent OSs operations.)

As used in this application, the terms "component," "module," "engine," "system," and/or functions associated therewith can be facilitated by a computer-related entity, such as hardware, firmware, software, software in execution; processor, computer readable medium; or combination thereof. For example, a component can be, but is not limited to being, a process running on a processor, a processor, an object, an executable, a thread of execution, a program, and/or a computer.

By way of illustration, both an application running on a computing device and/or the computing device itself can represent a component. One or more components can reside within a process and/or thread of execution and a component can be localized on one computer and/or distributed between two or more computers. In addition, these components can execute from various computer readable media having various data structures stored thereon. In another example, the computer-readable medium can include various sets of codes for causing a computer to interact with information indicating the states associated with a system that implements the subject innovation. The components can communicate by way of local and/or remote processes such as in accordance with a signal having one or more data packets (e.g., data from one component interacting with another component in a local system, distributed system, and/or across a network such as the Internet with other systems by way of the signal).

Any aspect or design described herein as "exemplary" is not necessarily to be construed as preferred or advantageous over other aspects or designs. Similarly, examples are provided herein solely for purposes of clarity and understanding and are not meant to limit the subject innovation or portion thereof in any manner. It is to be appreciated that a myriad of additional or alternate examples could have been presented, but have been omitted for purposes of brevity.

Furthermore, all or portions of the subject innovation can be implemented as a system, method, apparatus, or article of manufacture using standard programming and/or engineering techniques to produce software, firmware, hardware or any combination thereof to control a computer to implement the disclosed innovation. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 10:
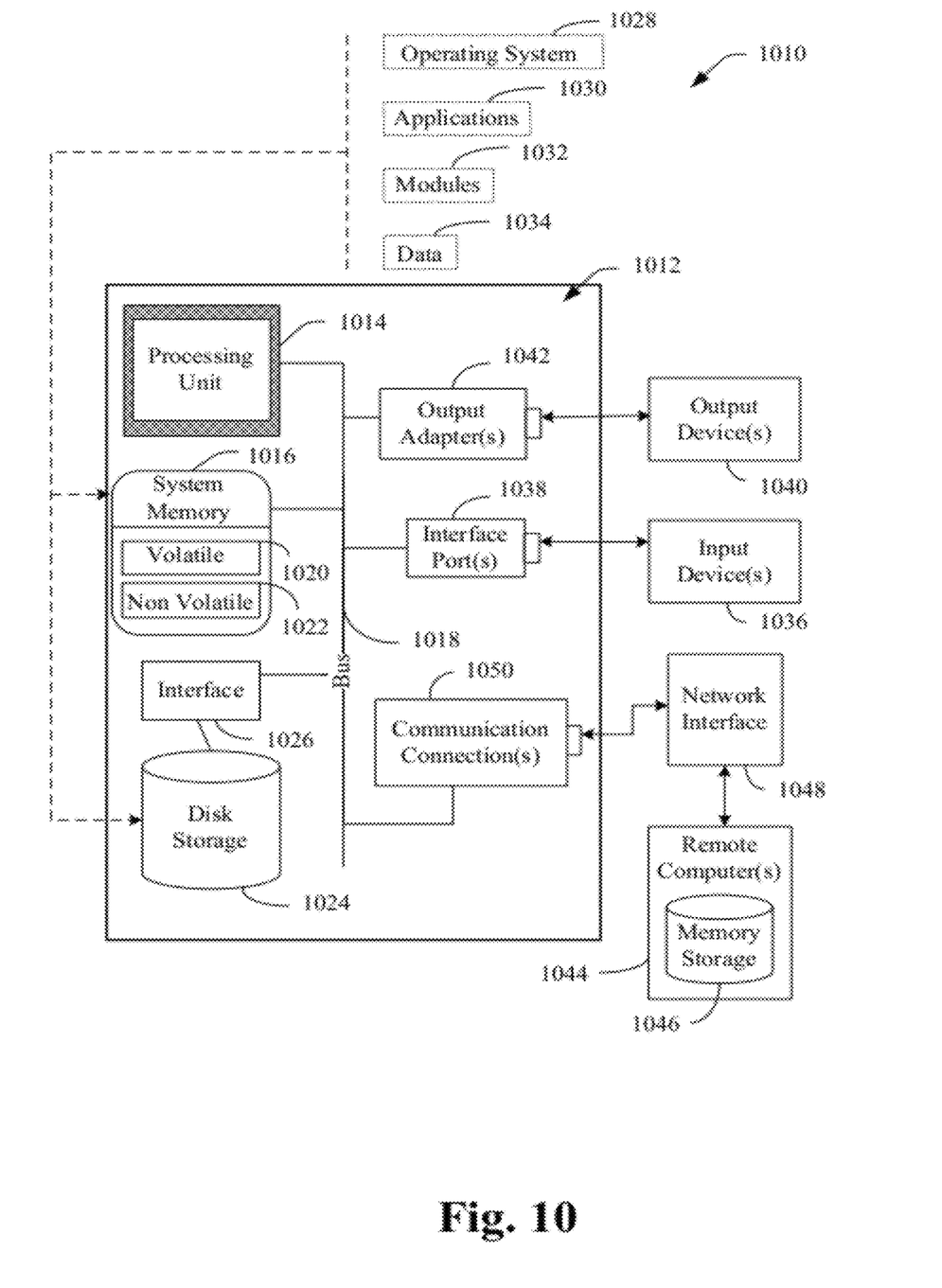
FIG. 10 illustrates an exemplary operating environment for implementing various aspects of the subject innovation.
Figure 11:
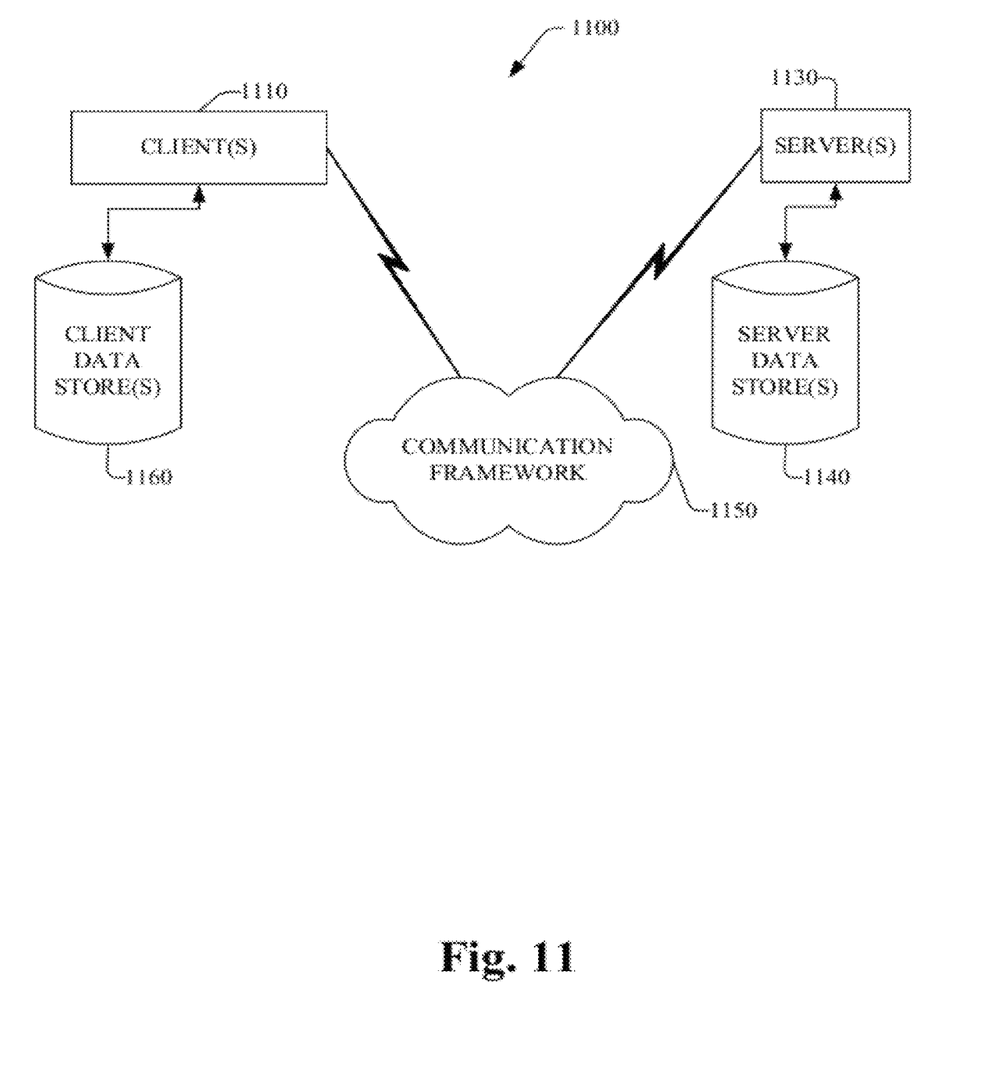
FIG. 11 illustrates a schematic block diagram of a sample computing environment with which the subject innovation can interact.

In order to provide a context for the various aspects of the disclosed subject matter, FIGS. 10 and 11 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the innovation also may be implemented in combination with other program modules. Generally, program modules include routines, programs, components, data structures, etc. that perform particular tasks and/or implement particular abstract data types. Moreover, those skilled in the art will appreciate that the innovative methods can be practiced with other computer system configurations, including single-processor or multi-processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the innovation can be practiced on stand-alone computers. In a distributed computing environment, program modules may be located in both local and remote memory storage devices.

With reference to FIG. 10, an exemplary environment 1010 for implementing various aspects of the subject innovation is described that includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable ROM (EEPROM), or flash memory. Volatile memory 1020 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1012 also includes removable/non-removable, volatile/non-volatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-60 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in suitable operating environment 1010. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that various components described herein can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040 that require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

FIG. 11 is a schematic block diagram of a sample-computing environment 1100 that can be employed for facilitating state migration in a virtualization platform. The system 1100 includes one or more client(s) 1110. The client(s) 1110 can be hardware and/or software (e.g., threads, processes, computing devices). The system 1100 also includes one or more server(s) 1130. The server(s) 1130 can also be hardware and/or software (e.g., threads, processes, computing devices). The servers 1130 can house threads to perform transformations by employing the components described herein, for example. One possible communication between a client 1110 and a server 1130 may be in the form of a data packet adapted to be transmitted between two or more computer processes. The system 1100 includes a communication framework 1150 that can be employed to facilitate communications between the client(s) 1110 and the server(s) 1130. The client(s) 1110 are operably connected to one or more client data store(s) 1160 that can be employed to store information local to the client(s) 1110. Similarly, the server(s) 1130 are operably connected to one or more server data store(s) 1140 that can be employed to store information local to the servers 1130.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims.

Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system comprising;
    a processor, communicatively coupled to a non-transitory computer readable medium that stores computer-executable instructions, that executes or facilitates execution of the computer-executable instructions, comprising:
        an application executing on a virtual machine that is associated with a primary machine, wherein the application determines at least one memory area, associated with a state of the application, that is to be migrated from the primary machine to a backup machine, and conveys the at least one memory area to a hypervisor via a kernel based shared memory page location of the primary machine that does not require interaction with an operating system of the primary machine; and
        wherein the hypervisor is associated with the primary machine, and the application conveys via the kernel based shared memory page location to the hypervisor a transaction boundary condition comprising a time period for migrating contents of the at least one memory area from the primary machine to the backup machine, and the hypervisor migrates contents of the at least one memory area from the primary machine to the backup machine based on the transaction boundary condition being satisfied.

2. The system of claim 1, wherein the application employs shared-memory based signaling to convey the memory area to the hypervisor.

3. The system of claim 1, wherein the kernel based shared memory page location has an assigned token identifier known to both the application and hypervisor.

4. The system of claim 3, wherein the hypervisor, in response to receipt of an indication from the application, instructs the backup machine to update at least one memory area on the backup machine corresponding to the at least one memory area with the contents of the at least one memory area migrated to the backup machine.

5. The system of claim 3, wherein the hypervisor, in response to receipt of an indication from the application, freezes the application for a commit period.

6. The system of claim 1, wherein the hypervisor identifies one or more elements of the at least one memory area that have changed since a prior migration.

7. The system of claim 6, wherein the hypervisor limits the migration of the contents of the at least one memory to the one or more elements of the at least one memory area that have changed.

8. The system of claim 1, wherein the application determines the at least one memory area based upon a criticality of the at least one memory area.

9. The system of claim 1, further comprising an authentication component that facilitates authentication of the application to a domain associated with the hypervisor.

10. A method, comprising;
    determining, by an application executing on a virtual machine that is associated with a primary machine, at least one memory area that is to be migrated from the primary machine to a backup machine;
    generating, by the application, a time condition associated with the at least one memory area being migrated from the primary machine to the backup machine;
    conveying, by the application via a kernel based shared memory page location of the primary machine that does not require interaction with an operating system of the primary machine, the at least one memory area and the time condition to a hypervisor associated with the primary machine; and migrating, by the hypervisor, contents of the at least one memory area from the primary machine to the backup machine in response to the time condition being satisfied.

11. The method of claim 10, further comprising stalling, by the hypervisor, the migrating contents of the at least one memory area from the primary machine to the backup machine in response to the time condition not being satisfied.

12. The method of claim 10, further comprising indicating, by the application to the hypervisor, that the at least one memory area is ready to be committed.

13. The method of claim 12, further comprising instructing, by the hypervisor in response to the indicating, the backup machine to update at least one memory area on the backup machine corresponding to the at least one memory area with the contents of the at least one memory area migrated to the backup machine.

14. The method of claim 12, further comprising freezing, by the hypervisor in response to the indicating, the application for a commit period.

15. The method of claim 10, further comprising identifying, by the hypervisor, one or more elements of the at least one memory area that have changed.

16. The method of claim 15, wherein the migrating comprises migrating only the one or more elements of the at least one memory area that have changed.

17. A non-transitory computer-readable medium having instructions stored thereon that, in response to execution, cause a primary machine, associated with a hypervisor and a virtual machine executing an application to be migrated, to perform operations, comprising:

determining, by the application, at least one memory area, associated with the application, that is to be migrated from the primary machine to a backup machine;

generating, by the application, a time condition associated with the at least one memory area being migrated from the primary machine to the backup machine;

communicating, by the application via a kernel based shared memory page location of the primary machine that does not require interaction with an operating system of the primary machine, the at least one memory area and the time condition to the hypervisor;

migrating, by the hypervisor, contents of the at least one memory area from the primary machine to the backup machine in response to the time condition being satisfied.

18. The non-transitory computer-readable medium of claim 17, wherein the application employs shared-memory based signaling to convey the memory area to the hypervisor.

19. The non-transitory computer-readable medium of claim 17, the operations further comprising identifying, by the hypervisor, one or more elements of the at least one memory area that have changed, and wherein the migrating comprises migrating only contents of the one or more elements of the at least one memory area that have changed.

20. The non-transitory computer-readable medium of claim 17, wherein the application determines the at least one memory area based upon a criticality of the at least one memory area.

* * * * *